United States Patent
Hutchison et al.

(10) Patent No.: US 9,990,324 B2
(45) Date of Patent: Jun. 5, 2018

(54) TWO MODES OF A CONFIGURATION INTERFACE OF A NETWORK ASIC

(71) Applicant: CAVIUM, INC., San Jose, CA (US)

(72) Inventors: Guy Townsend Hutchison, Santa Clara, CA (US); Harish Krishnamoorthy, San Jose, CA (US); Gerald Schmidt, San Jose, CA (US); Vishal Anand, Saratoga, CA (US)

(73) Assignee: Cavium Inc., San Jose, CA (US)

( * ) Notice: Subject to any disclaimer, the term of this patent is extended or adjusted under 35 U.S.C. 154(b) by 504 days.

(21) Appl. No.: 14/521,354

(22) Filed: Oct. 22, 2014

(65) Prior Publication Data

US 2016/0117282 A1    Apr. 28, 2016

(51) Int. Cl.
G06F 13/40     (2006.01)
G06F 13/42     (2006.01)

(52) U.S. Cl.
CPC ...... G06F 13/4068 (2013.01); G06F 13/4221 (2013.01)

(58) Field of Classification Search
CPC ... G06F 5/00; G06F 9/00; G06F 12/00; G06F 13/00
See application file for complete search history.

(56) References Cited

U.S. PATENT DOCUMENTS

| | | |
|---|---|---|
| 7,796,627 B2 | 9/2010 | Hurley et al. |
| 9,241,304 B2 | 1/2016 | Dawson et al. |
| 9,253,043 B2 | 2/2016 | Adolphson |
| 2014/0126578 A1* | 5/2014 | Yoon ................ H04L 12/4625 370/404 |
| 2015/0146626 A1* | 5/2015 | Sinha ................ H04W 56/001 370/329 |

* cited by examiner

*Primary Examiner* — Scott Sun
(74) *Attorney, Agent, or Firm* — Haverstock & Owens LLP

(57) ABSTRACT

Embodiments of the present invention are directed to a configuration interface of a network ASIC. The configuration interface allows for two modes of traversal of nodes. The nodes form one or more chains. Each chain is in a ring or a list topology. A master receives external access transactions. Once received by the master, an external access transaction traverses the chains to reach a target node. A target node either is an access to a memory space or is a module. A chain can include at least one decoder. A decoder includes logic that determines which of its leaves to send an external access transaction to. In contrast, if a module is not the target node, then the module passes an external access transaction to the next node coupled thereto; otherwise, if the module is the target node, the transmission of the external access transaction stops at the module.

19 Claims, 3 Drawing Sheets

TWO MODES OF A CONFIGURATION INTERFACE OF A NETWORK ASIC

FIELD OF INVENTION

The present invention relates to network ASICs. More particularly, the present invention relates to two modes of a configuration interface of a network ASIC.

BACKGROUND OF THE INVENTION

A configuration interface of a chip needs to be extremely robust and satisfy several conditions as this is the interface through which all interfaces, such as PCIe, MDIO, I2C, etc., access an entire register or memory space.

BRIEF SUMMARY OF THE INVENTION

Embodiments of the present invention are directed to a configuration interface of a network ASIC. The configuration interface allows for two modes of traversal of nodes. The nodes form one or more chains. Each chain is in a ring or a list topology. A master receives external access transactions. Once received by the master, an external access transaction traverses the chains to reach a target node. A target node either is an access to a memory space or is a module. A chain can include at least one decoder. A decoder includes logic that determines which of its leaves to send an external access transaction to. In contrast, if a module is not the target node, then the module passes an external access transaction to the next node coupled thereto; otherwise, if the module is the target node, the transmission of the external access transaction stops at the module.

In one aspect, a network device is provided. The network device includes memory, a controller receiving an external access transaction from a source, a plurality of slaves, wherein each of the plurality of slaves includes a set of registers, and a network ASIC including a configuration interface that allows for two modes of traversal of nodes for propagation of the external access transaction to a target node.

In some embodiments, the network device also includes a CPU, wherein the source is the CPU.

In some embodiments, the nodes form one or more chains. In some embodiments, each of the one or more chains is in a ring topology or a list topology.

In some embodiments, the chain includes at least one decoder. The at least one decoder includes logic that determines which of its leaves to send the external access transaction to. The nodes include the at least one decoder.

In some embodiments, the target node is an access to the memory. Alternatively, the target node is one of the plurality of slaves.

In some embodiments, the propagation of the external access transmission stops at one of the at least one slave when the one of the at least one slave is the target node. Alternatively, the propagation of the external access transmission is passed from one of the at least one slave when the one of the at least one slave is not the target node.

In some embodiments, the nodes are arranged in a tree structure.

In some embodiments, the nodes include the controller and the plurality of slaves.

In another aspect, a network device is provided. The network device includes a plurality of nodes forming one or more chains. The plurality of nodes includes a controller receiving an external access transaction from a source, a plurality of modules, wherein each module includes a set of registers, and at least one decoder, wherein each of the at least one decoder includes logic that determines which of the plurality of nodes to send the external access transaction to.

The network device also includes a network ASIC including a configuration interface that allows for two modes of traversal of the nodes for transmission of the external access transaction to a target node.

In some embodiments, the one or more chains include a ring of nodes. In some embodiments, the one or more chains include a list of nodes.

In some embodiments, the list of nodes includes the at least one decoder.

In some embodiments, the transmission of the external access transaction to one of the plurality of modules either stops at the one of the plurality of modules or is passed by the one of the plurality of module to the next node coupling therewith. The transmission is dependent on whether the one of the plurality of modules is the target node.

In some embodiments, the external access transaction includes a read instruction, a write instruction or a combination thereof.

In some embodiments, the set of registers is implemented as flip-flops.

In some embodiments, the network device also includes memory. In some embodiments, the plurality of nodes includes at least one access to the memory.

In yet another aspect, a method of implementing a network ASIC in a network device is provided. The network device includes a plurality of nodes arranged in a tree structure. The method includes receiving at a trunk of the tree an external access transaction from a source. In some embodiments, the trunk of the tree is a controller. In some embodiments, the source is a CPU.

The method also includes traversing the tree until the external access transaction reaches a target node. The method also includes, for each node in the tree that is traversed, when a corresponding node is of a first type, the corresponding node determining which link to send the external access transaction out on and sending the external access transaction out on that link, when the corresponding node is of a second type, the corresponding node processing the external access transaction accordingly, when the corresponding node is of a third type and the corresponding node is not the target node, the corresponding node sending the external access transaction out to the next node coupling therewith, and when the corresponding node is of the third type and the corresponding node is the target node, the corresponding node processing the external transaction accordingly. In some embodiments, the first type is decoder, the second type is an access to memory, and the third type is a module, wherein the module is a set of registers.

In some embodiments, the target node is either an access to memory or a module.

In some embodiments, the method further includes, after processing the external access transaction by the target node, the target node generating an acknowledgment, and sending the acknowledgment back to the trunk of the tree along a traversal route.

In some embodiments, the external access transaction includes a read instruction, a write instruction or a combination thereof.

BRIEF DESCRIPTION OF THE DRAWINGS

The foregoing will be apparent from the following more particular description of example embodiments of the inven

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

A network device includes a CPU (central processing unit) coupled with a network ASIC (application specific integrated circuit). The network ASIC is accessed by the CPU. The network device also includes memory, a master and one or more slaves. One or more of the memory, the master and the one or more slaves can be located on chip, such as on the network ASIC. The master is a controller and receives external access transactions, such as from the CPU. An external access transaction can include read and/or write instructions. A slave includes a set of registers. In some embodiments, the registers are implemented as flip-flops.

Embodiments of the present invention are directed to a configuration interface of a network ASIC. The configuration interface allows for two modes of traversal of nodes. The nodes form one or more chains. Each chain is in a ring or a list topology. A master receives external access transactions. Once received by the master, an external access transaction traverses the chains to reach a target node. A target node either is an access to a memory space or is a module. A chain can include at least one decoder. A decoder includes logic that determines which of its leaves to send an external access transaction to. In contrast, if a module is not the target node, then the module passes an external access transaction to the next node coupled thereto; otherwise, if the module is the target node, the transmission of the external access transaction stops at the module.

Figure 1:
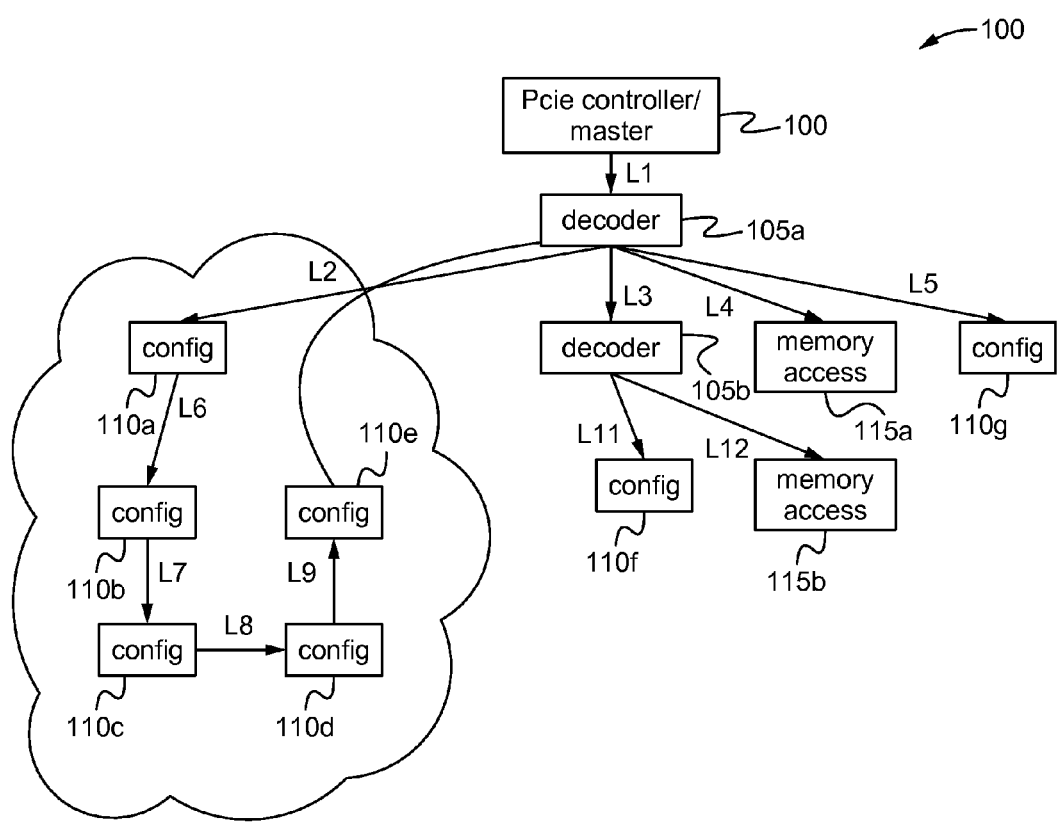
- FIG. 1 illustrates an exemplary configuration interface of a network ASIC in a network device in accordance with some embodiments.

FIG. 1 illustrates an exemplary configuration interface of a network ASIC in a network device in accordance with some embodiments. Nodes of the network device are arranged in a tree structure that includes a trunk, branch(es) and leaves. The nodes include a master 100 as the trunk of the tree. In FIG. 1, the master 100 is a PCIe (peripheral component interconnect express) controller, although other controllers are contemplated.

The nodes also include at least one decoder (105, generally). Each decoder 105 forms a part of a branch of the tree. Two decoders 105a, 105b are shown in FIG. 1. However, more or less decoders 105 can be included, depending on the specific application. A decoder 105 includes MUX logic that determines where an external access transaction should be sent to.

The nodes also include a plurality of modules (110, generally) as the leaves of the tree. In FIG. 1, a module is block 110 labeled as "config." The terms "module," "slave" and "config" are used interchangeably herein and in the figures. Each module is a slave that includes a set of registers. The transmission of an external access transaction reaching a particular module 110 can either stop at that particular module 110 or be passed by that particular module 110 to the next node coupling therewith, depending on whether that particular module 110 is the target node.

In some embodiments, the leaves of the tree can also include at least one access to a memory space (115, generally). In FIG. 1, an access to the memory space is block 115, labeled as "memory access." Two memory access blocks 115 are shown in FIG. 1. However, more or less memory access blocks 115 can be included, depending on the specific application. For example, in some embodiments, a configuration interface does not include any memory access blocks 115. The transmission of an external access transaction reaching a memory access block 115 stops at that memory access block 115.

It should be noted that nodes coupled downstream with a decoder 105 are also referred to as leaves. For example, the leaves of the decoder 105a are the module 110a, the decoder 105b, the memory access block 115a and the module 110g. For another example, the leaves of the decoder 105b are the module 110f and the memory access block 115b.

In FIG. 1, the nodes form one ring and four lists. The ring is formed by the decoder 105a and the modules 110a-110e. One list is formed by the decoders 105a-105b and the module 110f. Another list is formed by the decoders 105a-105b and the memory access block 115b. Another list is formed by the decoder 105a and the memory access block 115a. Another list is formed by the decoder 105a and the module 110g. Note FIG. 1 is shown for illustrative purposes only, and is not meant to restrict the scope of the present disclosure to any particular arrangement of nodes. For example, the master can be coupled to any number of and any combination of decoder(s) and ring(s).

Still referring to FIG. 1, an external access transaction, such as from the CPU, is received at the trunk of the tree, specifically the master 100, and traverses the tree to a target node. A target node can be a module 110 or a memory access block 115. The master 100 transmits the external access transaction to the decoder 105a on link L1. The decoder 105a includes logic that determines which of its leaves (i.e., the module 110a, the decoder 105b, the memory access block 115a, the module 110g) to send the external access transaction to.

For example, assume that the target node is the memory access block 115b. The external access transaction will traverse the list that includes links L1, L3 and L12 to the memory access block 115b. The following describes the corresponding sequence of steps. At first, the master 100 sends the external access transaction on link L1 to the decoder 105a. Once received, the decoder 105a determines that the outgoing link is L3 in order for the external access transaction to reach the memory access block 115b and sends the external access transaction out on link L3 to the decoder 105b. Once received, the decoder 105b determines that the outgoing link is L12 in order for the external access transaction to reach the memory access block 115b and sends the external access transaction out on L12 to the memory access block 115b. The external access transaction has now reached the target node. After the memory access block 115b (the target node) processes the external access transaction accordingly, the memory access block 115a generates and sends an acknowledgment to the decoder 105*b*. After the decoder 105*b* receives the acknowledgment from the memory access block 115*a*, the decoder 105*b* forwards the acknowledgment to the decoder 105*a*. Similarly, after the decoder 105*a* receives the acknowledgment from the decoder 105*b*, the decoder 105*a* forwards the acknowledgment to the master 100.

For another example, assume that the target node is the module 110*c*. The external access transaction traverses the ring that includes links L1, L2, L6 and L7 to the module 110*c*. The following describes the corresponding sequence of steps. At first, the master 100 sends the external access transaction on link L1 to the decoder 105*a*. Once received, the decoder 105*a* determines that the outgoing link is L2 in order for the external access transaction to reach the module 110*c* and sends the external access transaction out on link L2 to the module 110*a*. Once received, the module 110*a* sends the external access transaction out on the only link (e.g., link L6) to the next node (e.g., the module 110*b*) because the module 110*a* is not the target node. Once received, the module 110*b* sends the external access transaction out on the only link (e.g., link L7) to the next node (e.g., the module 110*c*) because the module 110*b* is not the target node. The external access transaction has now reached the target node. After the module 110*c* (the target node) processes the external access transaction, the module 110*c* generates and sends an acknowledgment to the module 110*b*. After the module 110*b* receives the acknowledgment from the module 110*c*, the module 110*b* forwards the acknowledgment to the module 110*a*. Similarly, after the module 110*a* receives the acknowledgment from the module 110*b*, the module 110*a* forwards the acknowledgment to the decoder 105*a*. Similarly, after the decoder 105*a* receives the acknowledgment from the decoder 105*b*, the decoder 105*a* forwards the acknowledgment to the master 100.

Figure 2A:
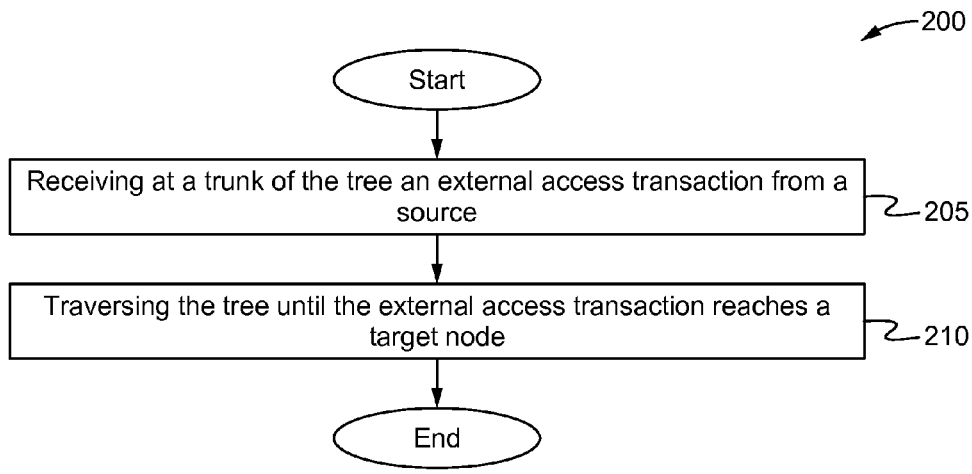
FIGS. 2A-2B illustrate an exemplary method of implementing a network ASIC in a network device in accordance with some embodiments.
Figure 2B:
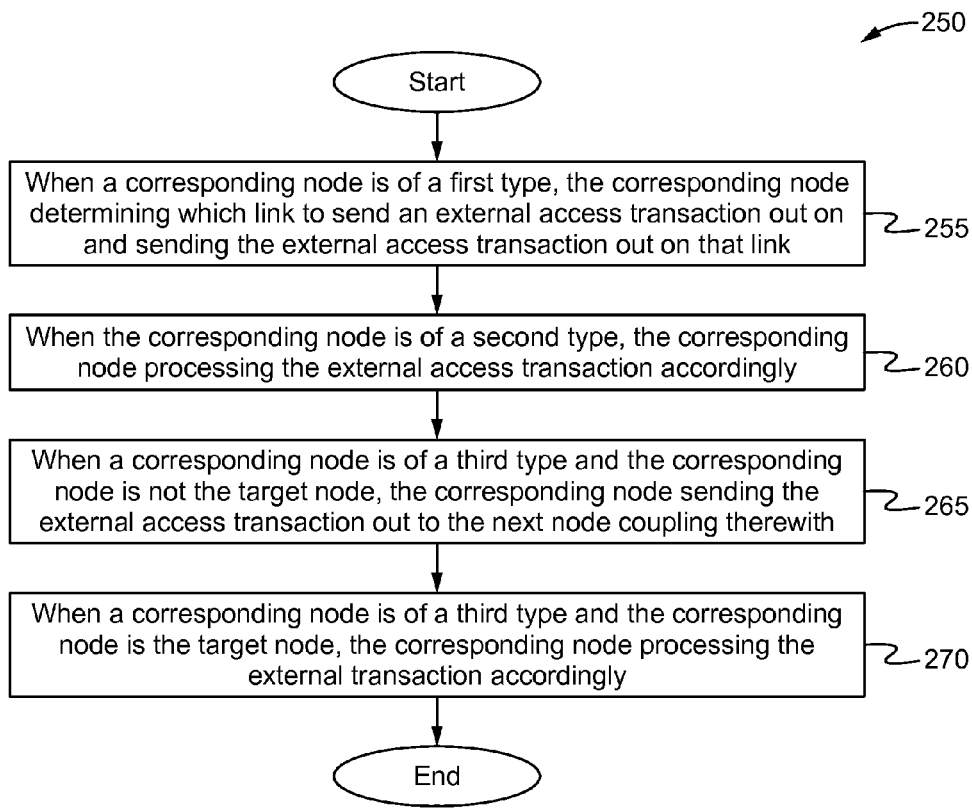

FIG. 2A illustrates an exemplary method 200 of implementing a network ASIC in a network device in accordance with some embodiments. The network device typically includes a plurality of nodes arranged in a tree structure. A configuration interface of the network ASIC allows for two modes of traversal of the nodes. At a step 205, an external access transaction from a source is received at a trunk of the tree. In some embodiments, the source is a CPU. In some embodiments, the trunk is a PCIe controller. The external access transaction includes a read instruction(s), a write instruction(s) or a combination thereof. At a step 210, the tree is traversed until the external access transaction reaches a target node. The target node is either an access to memory or a module, which is a set of registers. At each node in the tree that is traversed, one of four events can occur, depending on what type a corresponding node is, as illustrated in FIG. 2B.

At a step 255, when the corresponding node is of a first type, the corresponding node determines which link to send the external access transaction out on and sends the external access transaction out on that link. In some embodiments, the first type is a decoder. In some embodiments, the decoder has hardware logic to make such a determination. At a step 260, when the corresponding node is of a second type, the corresponding node processes the external access transaction accordingly. The corresponding node that is of the second type is the target node. In some embodiments, the second type is an access to memory. At a step 265, when the corresponding node is of a third type and the corresponding node is not the target node, the corresponding node sends the external access transaction out to the next node coupled downstream therewith. In some embodiments, the third type is a module. A module includes a set of registers. At a step 270, when the corresponding node is of the third type and the corresponding node is the target node, the corresponding node processes the external transaction accordingly. After the external access transaction is processed by the target node, an acknowledgment is sent back along a traversal route. The target node typically generates the acknowledgment that is sent back to the controller via the traversal route.

The tradeoffs between the list approach and ring approach include cost and latency. For example, the benefits of the ring approach are that coupling the nodes in the ring uses the least number of wires and has minimal routing overhead, thereby reducing costs. However, these benefits are at the expense of latency. Operation latency can be very high with large number of nodes in the ring. Furthermore, flow control lock-up by a single node in the ring can potentially block the entire ring. In contrast, the benefit of the list approach is that there is low operation latency. However, this benefit is at the expense of routing and wire cost.

Figure 3:
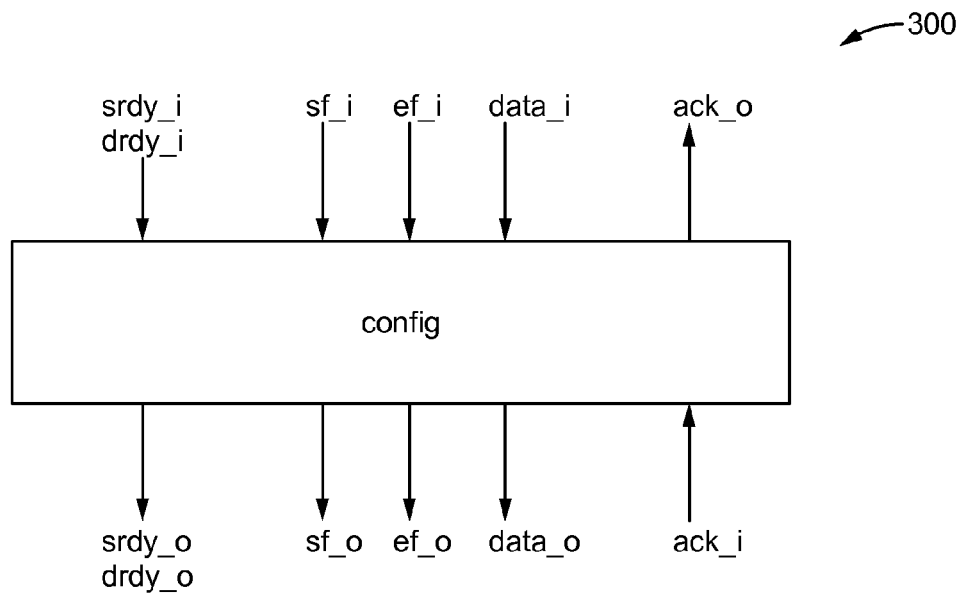
FIG. 3 illustrates an exemplary interface of a module in accordance with some embodiments.

FIG. 3 illustrates an exemplary interface of a module 300 in accordance with some embodiments. The module 110 of FIG. 1 is similarly configured as the module 300. Inputs of the module 300 include inputs labeled as srdy_i drdy_i, sf_i, ef_i, data_i in FIG. 3. Data is received at these inputs from the preceding node coupled upstream with the module 300. Outputs of the module 300 include outputs labeled as srdy_o drdy_o, sf_o, ef_o, data_o in FIG. 3. Data is sent from these outputs to the next node coupled downstream with the module 300. These outputs are not enabled in a particular module, such as the module 110*f* and the module 110*g* of FIG. 1, that has no nodes coupled downstream with that particular module.

The module 300 also includes an input labeled as ack_i and an output labeled as ack_o. An acknowledgment either generated or received by the module 300 is sent out from the ack_o output to the preceding node coupled upstream with the module 300. An acknowledgment sent from the node coupled downstream with the module 300 is received at the ack_i input. This input is not enabled in a particular module, such as the module 110*f* and the module 110*g* of FIG. 1, that has no nodes coupled downstream with that particular module.

Figure 4:
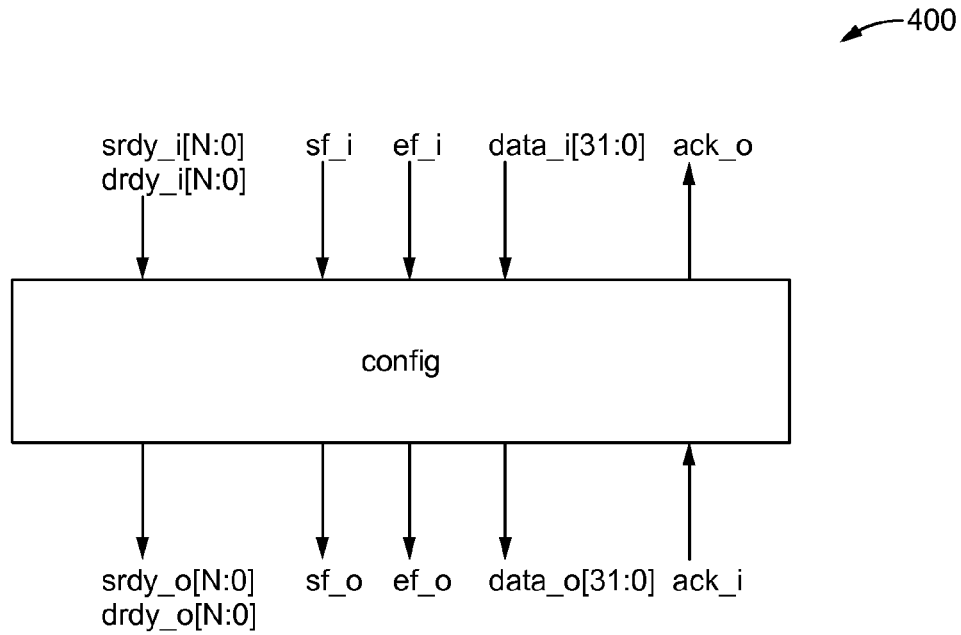
FIG. 4 illustrates an exemplary interface of a decoder in accordance with some embodiments.

FIG. 4 illustrates an exemplary interface of a decoder 400 in accordance with some embodiments. The decoder 105 of FIG. 1 is similarly configured as the decoder 400. Inputs of the decoder 400 include inputs labeled as srdy_i[N:0] drdy_i [N:0], sf_i, ef_i, data_i[31:0] in FIG. 4. Data is received at these inputs from the preceding node coupled upstream with the decoder 400. Outputs of the decoder 400 include outputs labeled as srdy o[N:0] drdy_o[N:0], sf_o, ef_o, data_o[31:0] in FIG. 4. N corresponds to the number of nodes that are coupled downstream with the decoder 400. Data is sent from these nodes to the one of these N nodes that are coupled downstream with the decoder 400.

The decoder 400 also includes an input labeled as ack_i and an output labeled as ack_o. An acknowledgment sent from the node coupled downstream with the decoder 400 is received at the ack_i input and is sent out through the ack_o output to the preceding node coupled upstream with the decoder 400.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A network device comprising:
a memory;
a controller receiving an external access transaction from a source;
a plurality of nodes comprising one or more memory access blocks, one or more decoders and a plurality of slaves, the plurality of nodes forming a plurality of rings and a plurality of chains that are each coupled to the controller, wherein a first decoder of the decoders is coupled with two or more first rings of the rings and two or more of first chains of the chains and, upon receiving the external access transaction, determines whether to forward the external access transaction onto one of the first rings or the first chains, wherein each of the plurality of slaves includes a set of registers; and
a network ASIC including a configuration interface that allows for two modes of traversal of the nodes for propagation of the external access transaction to a target node.

2. The network device of claim 1, further comprising a CPU, wherein the source is the CPU.

3. The network device of claim 1, wherein a second decoder of the decoders is coupled to the first decoder as a part of one of the first chains.

4. The network device of claim 3, wherein the second decoder is coupled to one or more second chains extending from the one of the first chains and, upon receiving the external access transaction, determines which of the first chains to forward the external access transaction onto.

5. The network device of claim 1, wherein the target node is an access to the memory.

6. The network device of claim 1, wherein the target node is one of the plurality of slaves.

7. The network device of claim 1, wherein the propagation of the external access transmission stops at one of the at least one slave when the one of the at least one slave is the target node.

8. The network device of claim 1, wherein the propagation of the external access transmission is passed from one of the at least one slave when the one of the at least one slave is not the target node.

9. The network device of claim 1, wherein the nodes are arranged in a tree structure.

10. The network device of claim 1, wherein the nodes include the controller and the plurality of slaves.

11. A network device comprising:
a controller receiving an external access transaction from a source;
a plurality of nodes forming a plurality of rings and a plurality of chains that are each coupled to the controller, wherein the plurality of nodes includes:
one or more memory access blocks;
a plurality of modules, wherein each module includes a set of registers; and
one or more decoders, wherein each of the decoders includes logic that determines which of the plurality of nodes to send the external access transaction to, wherein a first decoder of the decoders is coupled with two or more first rings of the rings and two or more of first chains of the chains and, upon receiving the external access transaction, determines whether to forward the external access transaction onto one of the first rings or the first chains; and
a network ASIC including a configuration interface that allows for two modes of traversal of the nodes for transmission of the external access transaction to a target node.

12. The network device of claim 11, wherein a second decoder of the decoders is coupled to one or more second chains extending from the one of the first chains and, upon receiving the external access transaction, determines which of the first chains to forward the external access transaction onto.

13. The network device of claim 11, wherein a second decoder of the decoders is coupled to the first decoder as a part of one of the first chains.

14. The network device of claim 11, wherein the transmission of the external access transaction to one of the plurality of modules either stops at the one of the plurality of modules or is passed by the one of the plurality of module to the next node coupling therewith.

15. The network device of claim 14, wherein the transmission is dependent on whether the one of the plurality of modules is the target node.

16. The network device of claim 11, wherein the external access transaction includes a read instruction, a write instruction or a combination thereof.

17. The network device of claim 11, wherein the set of registers is implemented as flip-flops.

18. The network device of claim 11, further comprising memory.

19. The network device of claim 18, wherein the plurality of nodes includes at least one access to the memory.

* * * * *